United States Patent [19]

Shimano

[11] Patent Number: 4,470,823
[45] Date of Patent: Sep. 11, 1984

[54] SPEED-CHANGING DEVICE FOR A BICYCLE

[75] Inventor: Keizo Shimano, Sakai, Japan

[73] Assignee: Shimano Industrial Company Limited, Osaka, Japan

[21] Appl. No.: 289,141

[22] Filed: Aug. 3, 1981

[30] Foreign Application Priority Data

Aug. 13, 1980 [JP] Japan .................. 55-111923[U]

[51] Int. Cl.³ .................. F16H 11/00; B60K 20/02
[52] U.S. Cl. .................. 474/82; 74/475
[58] Field of Search .................. 74/142, 475, 459; 474/80, 82; 188/82.7

[56] References Cited

U.S. PATENT DOCUMENTS

| | | | |
|---|---|---|---|
| 3,394,604 | 7/1968 | Kimura | 474/82 |
| 4,193,309 | 3/1980 | Nagano | 474/82 |
| 4,198,873 | 4/1980 | Nagano et al. | 474/82 |
| 4,232,564 | 11/1980 | Yamasaki | 74/489 |
| 4,267,744 | 5/1981 | Yamasaki | 74/475 |
| 4,306,871 | 12/1981 | Nagano | 474/82 |

Primary Examiner—John E. Murtagh
Assistant Examiner—Andrew Joseph Rudy
Attorney, Agent, or Firm—Stevens, Davis, Miller & Mosher

[57] ABSTRACT

A speed-changing device for a bicycle, which comprises a control device having a control lever, a derailleur comprising a fitting member, a four member linkage mechanism having a chain guide and a return spring, and a control wire, said control device having a first positioning mechanism for positioning the chain guide only during returning motion of said chain guide by said return spring, said derailleur having a second positioning mechanism for positioning of said chain guide only during forward motion of said chain guide through a pulling operation of said wire.

5 Claims, 9 Drawing Figures

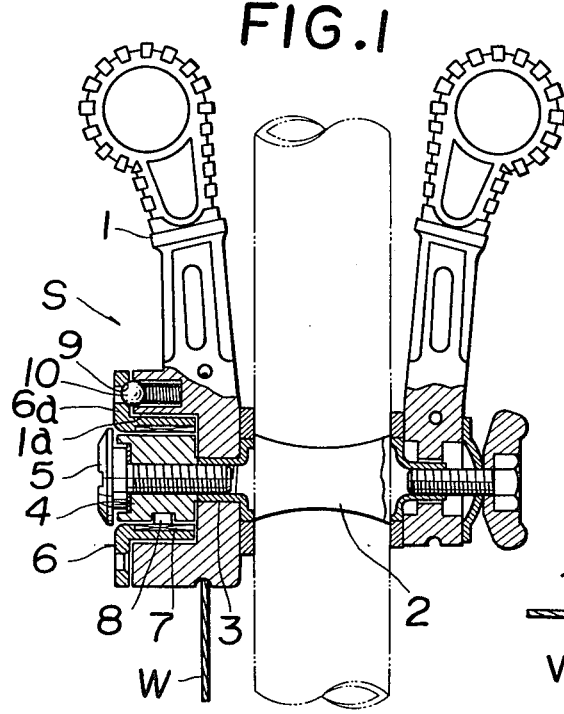
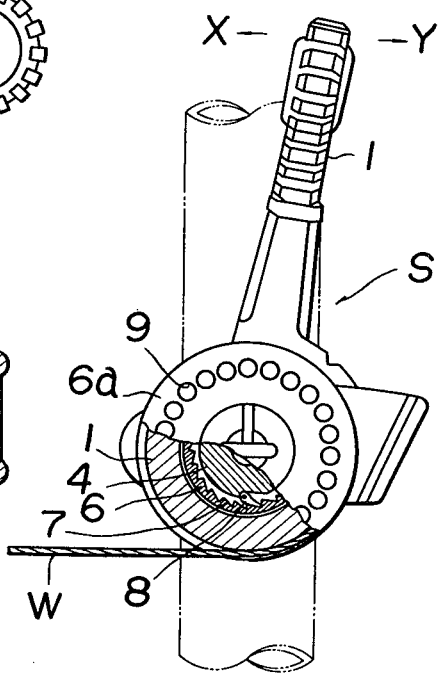
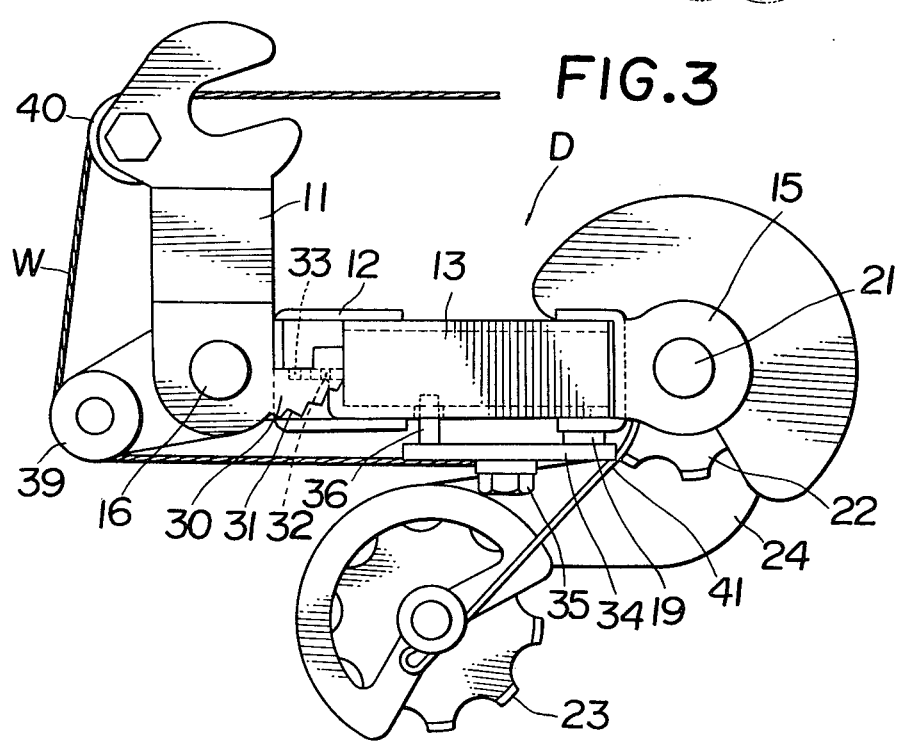

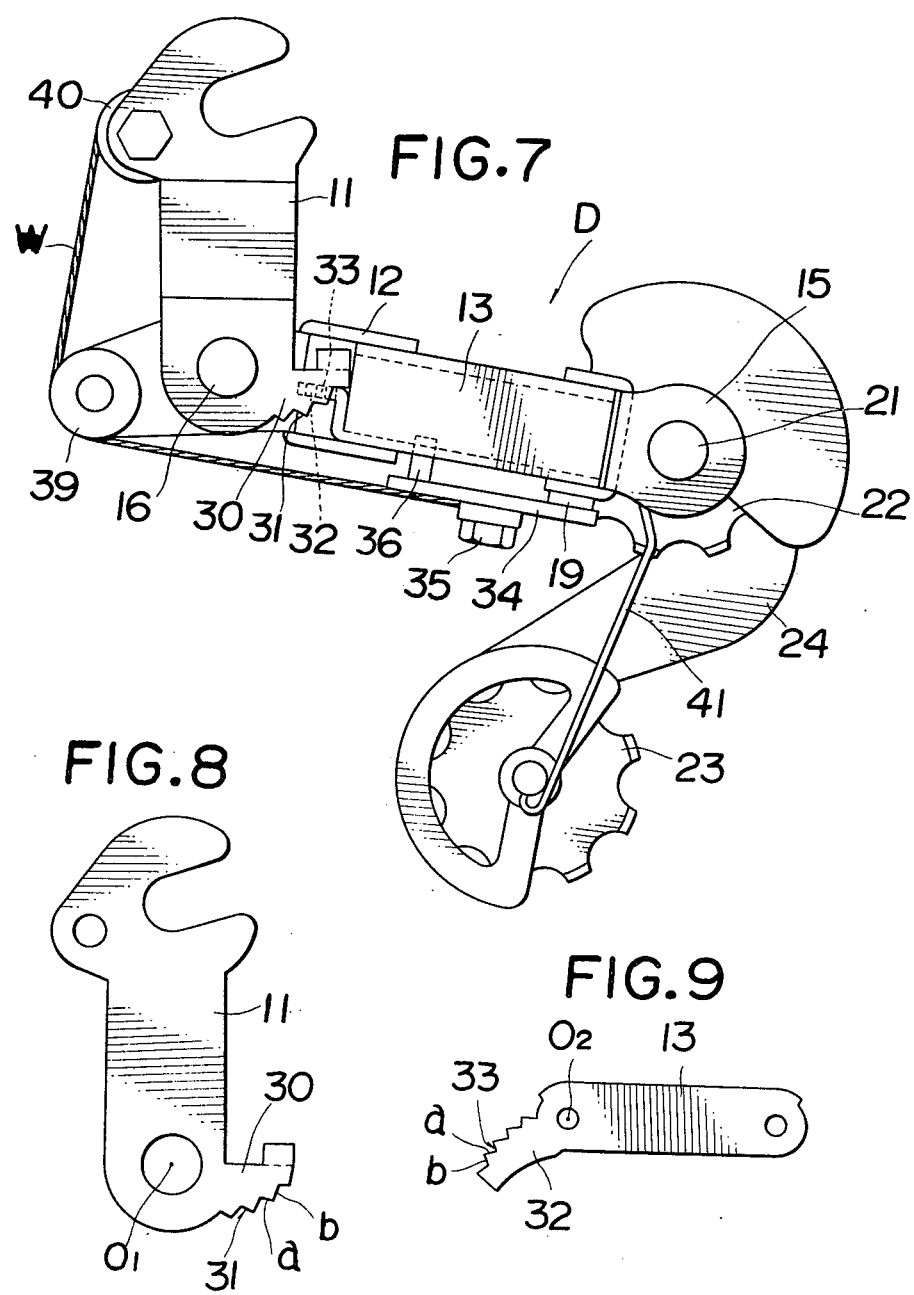

SPEED-CHANGING DEVICE FOR A BICYCLE

FIELD OF THE INVENTION

This invention relates to a speed-changing device for a bicycle, which comprises a control device having a control lever, a derailleur comprising a fitting member, a four member linkage mechanism pivotally supported to said fitting member and having a chain guide and a return spring, and a control wire for connecting said control lever with said derailleur.

BACKGROUND OF THE INVENTION

Generally, this kind of speed-changing device is so constructed that the control lever is operated to move forward to thereby pull the wire so that the four member linkage mechanism can be transformed against the return spring provided at the four member linkage mechanism, whereby the chain guide can move forward. The control lever is also operable to return so as to allow the return spring to return so that the chain guide can also return.

However, in this construction, when the control lever is operated while applying thereto a rotational resistance which overcomes the return spring, it is necessary to keep the control lever in a predetermined functional position. Hence, especially when the control lever is operating against the return spring, it is necessary to apply to the lever a force which overcomes the force of the return spring and the rotational resistance, so that a significant amount of force is required to operate the control lever and a light touch speed-change operation cannot be performed.

With respect to the above problem, it has been proposed that one of the four members which constitute the linkage mechanism at the derailleur be provided with a positioning plate which has a number of recesses therein corresponding to the number of speed-changing stages. Another member moving relative to the member which is provided with the positioning plate is provided with a ball engageable with the recesses. When the above two members move relative to each other, the ball travels with respect to the recesses to thereby engage with a selected one of the recesses of a selected speed-changing position, whereby the speed-changing positions of the chain guide are determined and these positions can be maintained.

However, in the above construction, because the ball is resiliently engaged with the recesses for maintaining the positions of the chain guide the return spring can not be used to cause the chain guide to return through the returning function of the return spring. As a result, it is necessary to utilize two wires of a general pull-type wire or to utilize a push-pull type wire for forcibly reciprocating the chain guide.

According to the above construction, since the return spring is not used, operation of the lever can be performed only by a force with which the ball can disengage from the recesses, whereby operation of the lever can be performed lightly to that extent. However, this construction cannot utilize a pull-type wire as the control wire thereby causing a problem that the speed-change device is expensive to manufacture.

SUMMARY OF THE INVENTION

This invention has been designed to overcome the aforesaid problems. An object of the invention is to provide a speed-changing device for a bicycle, by which a speed-change operation through the forward motion of a control lever can be lightly performed even though a return spring is used. In addition, only one conventional pull-type wire is utilized as the control wire so that speed-changing positions can be accurately selected and maintained.

The invention serves as a speed-changing device for a bicycle, which comprises a control device having a control lever, a derailleur and a control wire for connecting the control lever with the derailleur, the derailleur comprising a fitting member, a four member linkage mechanism pivotally supported to the fitting member and having a chain guide and a return spring, the control lever being operated to pull the wire so that the four member linkage mechanism at the derailleur can be transformed against the return spring to thereby allow the chain guide to move forward, the control lever being operated to return the wire so that the chain guide can return through the returning function of the return spring. The control device comprises a first positioning mechanism which determines the position of the chain guide only during the returning motion of the chain guide through the return spring, and the derailleur further comprises a second positioning mechanism which determines the position of the chain guide only during forward motion of the chain guide.

According to the invention, although a return spring is used at the four member linkage mechanism in the derailleur, it is not necessary to apply a rotational resistance to the control lever which overcomes the spring force of the return spring. Hence, when the control lever is operated to pull the wire against the return spring, the control lever requires only a force sufficient to overcome the spring force of the return spring so as to operate the speed-change, whereby the speed-change operation through the control lever's pull operation on wire can be performed lightly. In addition, the positioning can be performed while using the return spring. And by using only one conventional pull type wire the control lever can be operated to return the wire so that the speed-change operation can be performed through the returning function of the return spring, whereby the speed-changing device is much less expensive to manufacture in comparison with the above described conventional speed changing devices utilizing two control wires or a particular push-pull type wire.

In addition, the first and second positioning mechanism can perform accurate positioning of the chain guide with respect to the sprockets and can securely maintain the chain guide at those positions.

These and other objects and novel features of the invention will be more apparent from the following description of an embodiment thereof in accordance with the accompanying drawings.

BRIEF DESCRIPTION OF THE DRAWINGS

FIG. 1 is a partially cutaway front view of the control device used in the speed-changing device of an embodiment of the invention.

FIG. 2 is a partially cutaway side view of the control device.

FIG. 3 is a front view of the derailleur of the speed changing device.

FIG. 7 is a front view corresponding to that of FIG. 6.

FIG. 8 is a front view showing the fitting member at the derailleur.

FIG. 9 is a bottom view showing the linkage member at the derailleur.

DETAILED DESCRIPTION OF THE INVENTION

Figure 4:
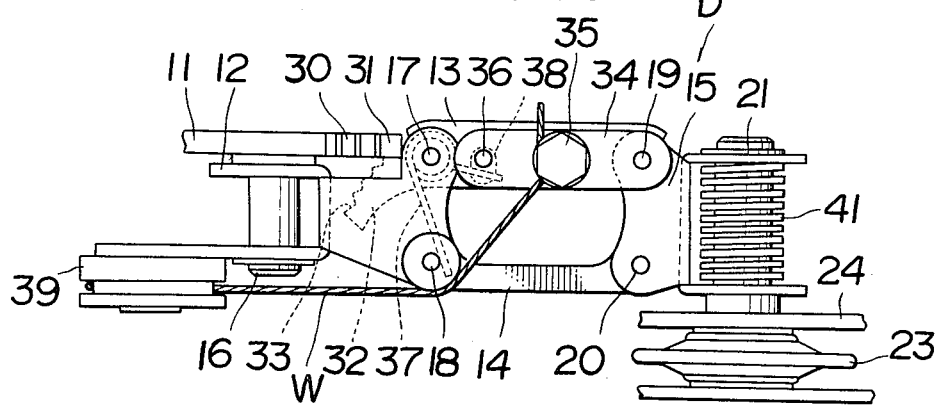
FIG. 4 is a bottom view of the derailleur.

The speed-changing device of the invention comprises a control device S having a control lever 1, a derailleur D and a control wire W for transmitting the motion of lever 1 to said derailleur D. First, the embodiments of the control device S will be described in connection with FIGS. 1 and 2, in which the the reference numeral 2 designates a band member having a lever shaft 3. The reference numeral 4 designates a holding member which is cylindrical and fixed to the axial end of the lever shaft 3 by a mounting nut 5. The band member 2 and holding member 4 constitute a fixing member. The control lever 1 is freely rotatably supported to the lever shaft 3. Between the control lever 1 and the holding member 4 a first positioning mechanism is arranged, which determines the positions of the chain guide only during returning motion of the chain guide at the derailleur D as described below.

The first positioning mechanism, as shown in FIGS. 1, 2, is so constructed that a control cylinder 6 having a flange 6a is interposed between the outer peripheral surface of the holding member 4 and the inner peripheral surface of a supporting bore 1a provided at the central portion of a boss of the control lever 1, the flange 6a being opposite to a side surface of the boss of the control lever 1. The control cylinder 6 freely rotates with respect to the holding member 4 and control lever 1. At the inner peripheral surface of the control cylinder 6 ratchets 7 are provided, and pawl 8 engageable therewith is supported to the outer peripheral surface of the holding member 4. The flange 6a is provided with a number of recesses 9 corresponding to the number of speed-changing stages. At the side surface of the boss of the control lever 1 an engaging member 10 is held, which may selectively engage with one of the recesses 9. The engaging member 10 is formed as a ball.

In this construction, the ratchets 7 and pawl 8 constitute a one-way mechanism, so that the control cylinder 6, when the control wire W is operated to be pulled by the control lever 1 (in the direction of the arrow X shown in FIG. 2), rotates freely with respect to the holding member 4. When the control wire W is operated to return (in the direction of the arrow Y shown in FIG. 2), the control cylinder 6 is unified and moves with the holding member 4.

In greater detail, the control cylinder 6 is connected with the control lever 1 through the resistance provided by the contact of engaging member 10 with one of the recesses 9. Hence, when the control lever 1 is operated to pull the wire, i.e., when the pawl 8 disengages from the ratchets 7 so that the control cylinder 6 becomes free with respect to the holding member 4 during forward motion of the control lever 1, the control cylinder 6 moves integrally with the control lever 1 and rotates freely with respect to the holding member 4. When the control lever 1 is operated to return the wire, i.e., during return motion of the control lever 1, the pawl 8 engages with the ratchets 7 so that the control cylinder 6 becomes unified with the holding member 4 to thereby prevent the control cylinder 6 from rotating with respect to the holding member 4. In this situation, the control lever 1 functions through the rotation thereof with respect to the control cylinder 6. The recesses 9 and engaging member 10 determine and hold the functioning positions of the control lever 1.

The just described embodiment uses the ratchets 7 and pawl 8 as a one-way mechanism. It should be noted that the positions of the ratchets 7 and pawl 8 can be reversed. Also, a clutch spring can be used instead of the ratchets 7 and pawl 8 to form the one-way mechanism.

In addition, the positions of the recesses 9 and engaging member 10 for the positioning by the control lever can be reversed.

Next, the embodiment of the derailleur D comprising the device of the invention will be described in accordance with FIGS. 3 through 9. The derailleur shown in FIGS. 3 through 9 is a rear derailleur which is basically constructed as shown in FIGS. 3, 4. It comprises a fitting member 11 and the four member linkage mechanism having a supporting member 12, two parallel linkage members 13, 14 and a movable member 15. The fitting member 11 is fixed together with a hub shaft (not shown) to the fork end (not shown) at the bicycle. The supporting member 12 of the four member linkage mechanism is supported freely swingably to the fitting member 11 by means of the transverse stud 16.

In addition, the supporting member 12 is provided at one side thereof with a pair of mounting tongues facing each other, the linkage members 13, 14 being pivoted to the mounting tongues through a pair of pins 17, 18. At the free ends of the linkage members 13 and 14 the movable member 15 is pivoted through a pair of pins 19 and 20.

The movable member 15 is similar in shape to the supporting member 12. Mounting tongues are provided at one side of the movable member 15 facing each other. The movable member 15 is pivotally supported at these mounting tongues to the linkage members 13 and 14 through the pins 19 and 20 so that the movable member 15 and the linkage members 13 and 14 are swingable with respect to each other.

At another side of the movable member 15 chain guide 24 is mounted rotatably to a predetermined extent through a transverse stud 21 which extends in the same direction of the transverse stud 16, the chain guide having two pulleys 22 and 23. The pulleys 22 and 23 on which a driving chain (not shown) is fitted conducts the driving chain to a selected one of a plurality of multi-speed sprockets (not shown). Therefore, the pulleys 22 and 23, when moved axially of the multi-speed sprockets, allow the driving chain to engage with a selected one of the sprockets so as to change the speed of a bicycle.

The just described derailleur construction is not different from that of a conventional derailleur. Hence, it can be fully understood from the above description.

The derailleur of the invention, which is constructed as just described does not have a spring between the fitting member 11 and the supporting member 12 of the four member linkage mechanism, so that the linkage mechanism can freely swing. In addition, between the fitting member 11 and the linkage mechanism a second positioning mechanism is provided for determining the positions of the chain guide 24 only during forward motion of the chain guide 24. The second positioning mechanism of the embodiments shown in FIGS. 3 through 9 is arranged between the fitting member 11 and the linkage member 13, the fitting member 11 being provided with a first control member 30 which extends toward the linkage member 13. The first control member 30 has a plurality of a first engaging portion 31 corresponding to a plurality of speed-change stages.

The linkage member 13 is provided with a second control member 32 which extends toward the fitting member 11, the second control member 32 having a plurality of a second engaging portion 33 corresponding to the speed-change stages and engageable with the first engaging portion 31 of the first control member 30. The engaging portions 31 and 33 engage with each other so that forward motion of the chain guide 24 is restrained and the positions thereof are determined.

In more detail, the first and second engaging portion 31 and 33 have, as shown in FIGS. 8 and 9, engaging surfaces a and sliding surfaces b respectively. The sliding surfaces b of the first engaging portion 31 are formed as a concentric arc around the axis 01 of the transverse stud 16. The sliding surfaces b of the second engaging portion 33 are formed as a concentric arc around the axis 02 of the pin 17 by which the linkage member 13 is pivoted to the supporting member 12. The first control member 30 is formed by extending the fitting member 11. The second control member 32 is formed mainly by extending the end of the linkage member 13.

The derailleur shown in FIGS. 3 through 7 is so constructed that an arm 34 is supported to the pin 19 which connects the movable member 15 with the linkage member 13, the arm 34 being independently swingable with respect to the linkage member 13. The end of the wire W is fixed at the wire holder 35 of the arm 34. Between the supporting member 12 and a pin 36 fixed to the arm 34 a return spring 37 is fitted. In addition, the linkage member 13 has an elongated slot 38 in which a pin 36 fixed to the arm 34 is inserted so as to be movable. The return spring 37 is wound around the pin 17, one end of the return spring 37 being retained at the pin 18 and other end of the return spring 37 being retained at the pin 36.

At the fitting member 11 and supporting member 12 wire guide means are provided for swinging the four member linkage mechanism with respect to the fitting member through the pull-operation of the wire W. That is, as shown in the drawings the wire guide means comprise two guide rollers 39 and 40, the first guide roller 39 being provided at the supporting member 12 and the second guide roller 40 being provided at the fitting member 11, these guide rollers 39 and 40 guiding the wire W. When the wire W is to be pulled, the end of the wire W which is fixed to the wire holder 35 through the first guide roller 39 is pulled, whereby the four member linkage mechanism executes a rotational moment in the clockwise direction around the transverse stud 16.

Referring to FIGS. 3 through 7, reference numeral 41 designates a tension spring which applies a tension to the driving chain, the tension spring 41 functions to urge the four member linkage mechanism in the counterclockwise direction around the transverse stud 16.

Next, the operation of the control lever and derailleur of the invention will be described.

Referring to FIGS. 3 and 4, the chain guide 24 is placed at the so called top position, corresponding to a high speed sprocket of smallest diameter. For switching the driving chain at the top position to a next middle speed sprocket adjacent to the high speed sprocket, the control lever 1 is operated and moved forward in the direction of the arrow X shown in FIG. 2 to thereby pull the control wire W in a stroke necessary for speed-change of one stage. Upon this forward motion of the control lever 1, the pawl 8 and ratchets 7 at the control device S disengage so that the control lever 1 and control cylinder 6 rotate integrally due to the contact resistance of the engaging member 10 engaging with the recesses 9.

Hence, the speed-changing operation is lightly performed by an operational force sufficient to overcoming a force of the return spring 37 at the derailleur D.

Figure 5:
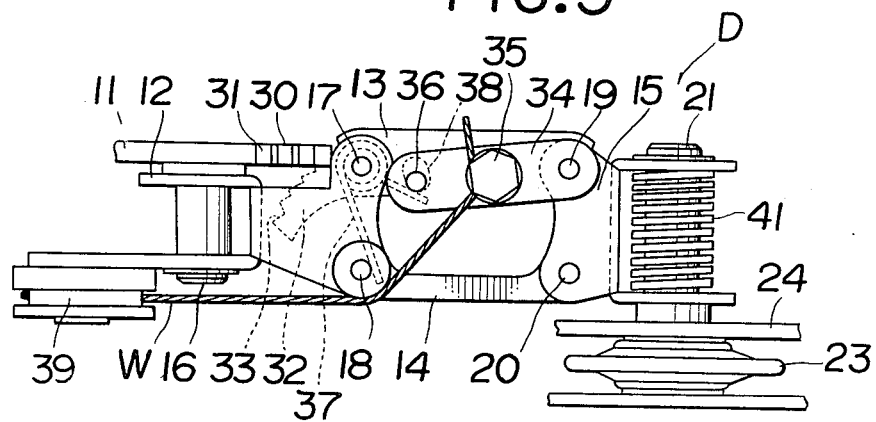
FIGS. 5 and 6 are bottom views showing the operation of the derailleur.
Figure 6:
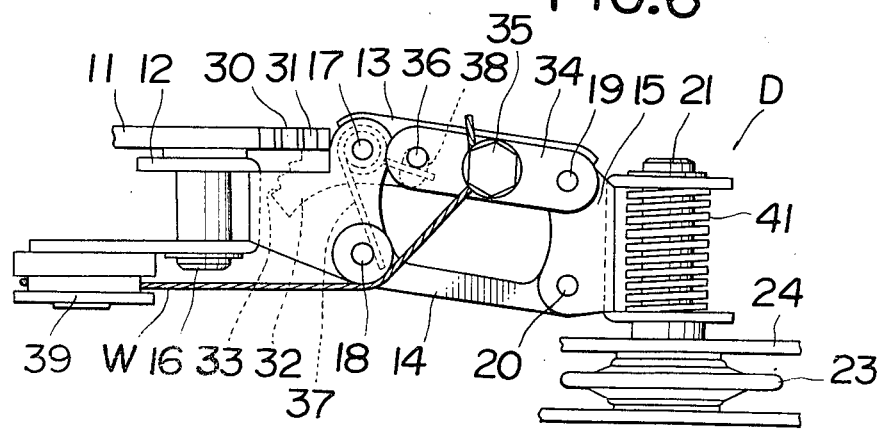

In more detail, by the pull-operation of the control wire through the forward motion of the control lever 1 the arm 34 first swings in a counterclockwise direction. The swinging range of the arm 34 is defined by the travel of pin 36 in the elongated slot 38 as it contacts with the ends thereof. The swinging amount of the arm 34 corresponds to the stroke necessary for the speed-change of one stage. When the arm 34 swings, the return spring 37 is bent, as shown in FIG. 5 to thereby be energized.

After the contacting of the pin 36 with the ends of the elongated slot 38, when the wire W is further pulled, the length of the wire W from the wire holder 35 to the second guide roller 40 becomes substantially shorter so that the four member linkage mechanism is forcibly swung around the transverse stud 16. By this swinging motion of the linkage mechanism, the chain guide 24 moves radially of the multi-stage sprockets.

In this instance, the sliding surfaces b of the second engaging portion 33 provided at the second control member 32 slides along the sliding surfaces b of the first engaging portion 31 provided at the first control member 30 while the four member linkage mechanism swings, whereby the retaining surfaces a of the second engaging portion 33 disengages from the retaining surfaces a of the first engaging portion 31 to thereby allow the four member linkage mechanism to be transformed.

Hence, the four member linkage mechanism is transformed, as shown in FIG. 4, by the energized force of the return spring 37 and the chain guide 24 moves at a single action in the axial direction of said multi-stage sprockets, so that the driving chain is shifted to the middle speed sprocket. In addition, by the movement of the chain guide 24 in the axial direction of the multi-stage sprockets the second engaging portion 33 comes to engage at the next stage's one of the retaining surfaces a thereof with the next stage's one of the retaining surfaces a of the first engaging portion 31, so that the speed-change position of the chain guide 24 is accurately determined and the chain guide 24 is kept in this position. In addition, the returning motion of the return spring 37 is received by the retaining surfaces a of the first engaging portion 33 so that said speed-change position is stably retained.

In the above described embodiment, the chain guide 24 first moves radially of the multi-stage sprockets and next moves in the axial direction thereof, so that the interval between the pulley 22 of the chain guide 24 and a selected one of the sprockets can be long to thereby increase the freedom of the driving chain. After the freedom of the driving chain is increased, the chain guide 24 moves in the axial direction of the multi-stage sprockets, whereby the pressure of contacting the surface of the driving chain with the sprocket is kept small so that an accurate speed-change operation can be performed by lightly controlling the wire.

In addition, the movement of the chain guide 24 in the axial direction of the sprockets can be performed in a single action by the energizing force in the return spring 37, i.e., the chain guide 24 can be rapidly traversed, to reduce noise and wear of the driving chain and sprockets regardless of the operation of the wire W.

To shift the driving chain form the middle speed sprocket to the high speed sprocket, the control lever 1 is operated to return in the direction of the arrow Y in FIG. 2, so that the control wire W is returned in a stroke necessary for the speed-change of one stage. In this instance, the chain guide 24 is returned by the restorative force of the return spring 37. Upon this return operation of the control lever 1, the pawl 8 and ratchets 7 at the control device S engage with each other and the control cylinder 6 is unified with the fitting member 4, whereby the control lever 1 rotates with respect to the control cylinder 6 and the engaging member 10 provided at the control lever 1 engages with the next stage's one of the recesses 9 so that speed-change positions can be accurately determined and securely maintained.

Upon return of the chain guide 24 performed by the returning operation of the control lever 1, the four member linkage mechanism is first transformed by the restorative force of the return spring 37. That is, the linkage members 13 and 14 swing in the counter clockwise direction to thereby allow the four member linkage mechanism to be transformed. In more detail, the sliding surfaces b of the second engaging portion 33 provided at the linkage member 13 is formed as an arc around the pin 17 which pivotally supports the linkage member 13 to thereby allow the linkage members 13 and 14 to freely swing in the counterclockwise direction as, so that the four member linkage mechanism can be transformed.

By said transformation of the four member linkage mechanism, the second engaging portion 33 disengages from the first engaging portion 31 so that the four member linkage mechanism swings in the counterclockwise direction around the transverse stud 16 through the function of the tension spring 41 to thereby shift the driving chain to the high speed sprocket. In this instance, the second engaging portion 33 engages at its next retaining surface (for a high-speed stage) of the retaining surfaces a with the next retaining surface (for a high speed stage, i.e., the first speed stage) of the retaining surfaces a of the first retaining portion 31.

When the control lever 1 is operated against the return spring 37 to thereby pull the wire W so as to move the chain guide 24 in the forward direction, the positioning of the chain guide 24 is performed by the second positioning mechanism provided at the derailleur D. Hence, the positioning of the chain guide 24 by the control device S is not necessary so that the control lever 1 can be lightly operated only by a force sufficient to overcome the force of return spring 37.

In addition, when the chain guide 24 is returned by operating the control lever 1 in the direction which allows the return spring 37 to function, the positioning of the chain guide 24 is performed by the first positioning mechanism provided at the control device S. Hence, in this instance, without positioning of the chain guide 24 by the second positioning mechanism of the derailleur D, the chain guide 24 can be returned by the return spring 37. Therefore, there is no need to utilize two wires or a push-pull type wire as the control wire W.

As a result, the invention provides a secure positioning of the chain guide while achieving a construction which is simple and inexpensive.

In the above-described embodiments, the second control member 32 is provided at the linkage member 13. Alternatively, the second control member 32 can be provided at the linkage member 14, or at the movable member 15 at the arm member 34 which is separate from the linkage members 13 and 14 and movable member 15.

In addition, when the arm 34 is utilized, the above described advantages can be expected, but the arm 34 is not necessarily provided.

Furthermore, when the arm 34 is utilized in the aforesaid embodiments, one return spring 37 serves also as an energizing spring. The energizing spring can also be separate from the return spring.

Additionally, the wire W in the invention is a bare-type wire, i.e., a pull-type wire without an outer sheath and is guided to the control lever by means of the two guide rollers 39 and 40. Alternatively, a holder for the outer sheath of the wire is preferably provided at the aforesaid portion of the fitting member 11 or supporting member 12 where the rollers are mounted, so that the holder for the outer sheath of the wire can function relatively to the wire.

Although several embodiments have been described, they are merely exemplary of the invention and not to be constructed as limiting, the invention being defined solely by the appended claims.

What is claimed is:

1. A speed-changing device for a bicycle comprising a control device having a control lever, a derailleur and a control wire connecting said control lever with said derailleur, said derailleur comprising a fitting member, a four member linkage mechanism pivoted to said fitting member, a return spring and a chain guide moveable to a plurality of speed-change positions upon movement of said linkage mechanism, said control lever being operable to pull said control wire to transform said four member linkage mechanism against said return spring to move said chain guide forward, said control lever being operable to return the wire to thereby return said chain guide through the restorative function of said return spring, said control device having a first positioning mechanism which determines the speed change position of said chain guide only during the returning movement of said chain guide by means of said return spring, said derailleur having a second positioning mechanism which determines the speed change position of said chain guide only during forward movement of said chain guide.

2. The speed-changing device for a bicycle according to claim 1, wherein said four member linkage mechanism comprises a supporting member, two linkage members and a movable member supporting said chain guide, both said supporting member at said four member linkage mechanism and said fitting member to which said four member linkage mechanism is pivotally supported having wire guide means by which said four member linkage mechanism can swing with respect to said fitting member by means of a pull-operation of said wire, said four member linkage mechanism having a wire holder for holding said wire which is guided by said wire guide means, said second positioning mechanism comprising a first control member which extends from said fitting member toward one of said linkage members and a second control member which extends from said linkage member toward said fitting member, said first control member having a plurality of first engaging portions which correspond to the number of speed-changing stages, said second control member having a plurality of second engaging portions which are engageable with said first engaging portions and correspond to the number of speed-changing stages, said first engaging portions engaging with said second engaging portions to restrain the movement of said chain guide in the forward direction thereof to position said chain guide.

3. The speed-changing device for a bicycle according to claim 2, wherein a said linkage member at said four member linkage mechanism comprises a saver arm having an energizing means and which moves relatively to said linkage member in a given range, said saver arm having a wire holder for said wire, whereby when said wire is pulled, said saver arm is moved and energized so that said four member linkage mechanism can be transformed by the energizing force in said saver arm.

4. The speed-changing device for a bicycle according to claim 1, wherein said control device comprises a fixing member having a lever shaft and a control lever freely movably supported to said lever shaft, said first positioning mechanism comprising a control cylinder arranged between said fixing member and said control lever, one of said control cylinder and said control lever having a plurality of recesses corresponding to the number of speed-change stages and the other of said control cylinder and said control lever having a engaging member engageable with one of said recesses, said control cylinder having a one-way mechanism by which said control cylinder freely rotates with respect to said fixing member when said control lever is operated to pull said control wire, said control cylinder being unified with said fixing member by means of said one-way mechanism when said control lever is operated to return said wire.

5. The speed-changing device for a bicycle according to claim 2, wherein said one-way mechanism comprises ratchets and a pawl.

* * * * *